US012664187B2

(12) United States Patent
Kim et al.

(10) Patent No.: US 12,664,187 B2
(45) Date of Patent: Jun. 23, 2026

(54) DYNAMIC SELECTION FROM AMONG MULTIPLE CANDIDATE GENERATIVE MODELS WITH DIFFERING COMPUTATIONAL EFFICIENCIES

(71) Applicant: GOOGLE LLC, Mountain View, CA (US)

(72) Inventors: Seungyeon Kim, New York, NY (US); Ankit Singh Rawat, Jersey City, NJ (US); Wittawat Jitkrittum, Jersey City, NJ (US); Hari Narasimhan, Mountain View, CA (US); Sashank Reddi, Fort Lee, NJ (US); Neha Gupta, New York, NY (US); Srinadh Bhojanapalli, Maplewoood, NJ (US); Aditya Menon, New York, NY (US); Manzil Zaheer, Mountain View, CA (US); Tal Schuster, New York, NY (US); Sanjiv Kumar, Jericho, NY (US); Toby Boyd, Columbus, OH (US); Zhifeng Chen, Sunnyvale, CA (US); Emanuel Taropa, Los Altos, CA (US); Vikram Kasivajhula, San Francisco, CA (US); Trevor Strohman, Sunnyvale, CA (US); Martin Baeuml, Zurich (CH); Leif Schelin, Zurich (CH); Yanping Huang, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 250 days.

(21) Appl. No.: 18/337,316

(22) Filed: Jun. 19, 2023

(65) Prior Publication Data

US 2024/0311405 A1 Sep. 19, 2024

Related U.S. Application Data

(60) Provisional application No. 63/451,897, filed on Mar. 13, 2023.

(51) Int. Cl.
*G06F 16/3329* (2025.01)
(52) U.S. Cl.
CPC ................................. *G06F 16/3329* (2019.01)
(58) Field of Classification Search
CPC ............................ G06F 16/3329; G06F 40/40
See application file for complete search history.

(56) References Cited

U.S. PATENT DOCUMENTS

2018/0278725 A1 * 9/2018 Thayer ................... H04L 69/22
2022/0156589 A1 5/2022 Chu
(Continued)

FOREIGN PATENT DOCUMENTS

WO 2022161644 A1 8/2022

OTHER PUBLICATIONS

Taylor, B. et al., "Adaptive Deep Learning Model Selection on Embedded Systems"; MetLab, School of Computing and Communications; retrieved from the internet:https://zwang4.github.io/publications/lctes18.pdf; 13 pages; dated Jun. 20, 2018.
(Continued)

*Primary Examiner* — Huyen X Vo
(74) *Attorney, Agent, or Firm* — Gray Ice Higdon

(57) ABSTRACT

Implementations disclose selecting, in response to receiving a request and from among multiple candidate generative models (e.g., multiple candidate large language models (LLMs)) with differing computational efficiencies, a particular generative model to utilize in generating a response to the request. Those implementations reduce latency and/or conserve computational resource(s) through selection, for various requests, of a more computationally efficient generative model for utilization in lieu of a less computationally efficient generative model. Further, those implementations seek to achieve such benefits, through utilization of more computationally efficient generative models, while also still
(Continued)

300

RECEIVE A REQUEST THAT INCLUDES A QUERY 352

SELECT, BASED ON REQUEST FEATURES OF REQUEST AND FROM A PLURALITY OF CANDIDATE GENERATIVE MODELS: A PARTICULAR GENERATIVE MODEL TO UTILIZE IN GENERATING RESPONSE(S) TO RENDER RESPONSIVE TO QUERY 354

SELECT BASED ON REQUEST FEATURE(S) THAT INCLUDE: QUERY FEATURE(S), DIALOG CONTEXT FEATURE(S), AND/OR ATTRIBUTE FEATURE(S) 354A

SELECT BASED ON CURRENT SERVER LOAD 354B

PROCESS THE REQUEST FEATURE(S), USING A TRAINED MACHINE LEARNING MODEL, AND SELECT BASED ON OUTPUT GENERATED BY THE PROCESSING 354C

SELECT BASED ON PROBABILITIES, INDICATED BY OUTPUT, FOR EACH OF THE GENERATIVE MODELS 354C1

ADJUST PROBABILITIES BASED ON COMPUTATIONAL EFFICIENCIES AND/ OR BASED ON CURRENT SERVER LOAD 354C2

USE SELECTED PARTICULAR GENERATIVE MODEL IN GENERATING RESPONSE(S) TO RENDER RESPONSIVE TO QUERY 356

CAUSE, IN RESPONSE TO QUERY, GENERATED RESPONSE(S) TO BE RENDERED 358 selectively utilizing less computationally efficient generative models for certain requests to mitigate occurrences of a generated response being inaccurate and/or under-specified. This, in turn, can mitigate occurrences of computational and/or network inefficiencies that result from a user issuing a follow-up request to cure the inaccuracies and/or under-specification of a generated response.

19 Claims, 6 Drawing Sheets

(56)              References Cited

U.S. PATENT DOCUMENTS

| | | | |
|---|---|---|---|
| 2023/0196033 A1* | 6/2023 | Robert Jose ............ | G06F 40/30 704/9 |
| 2024/0095463 A1* | 3/2024 | Leary ...................... | G06F 40/20 |
| 2024/0176958 A1* | 5/2024 | Raimondo ........... | G06N 3/0455 |
| 2024/0289360 A1* | 8/2024 | Chepkwony ........ | G06F 16/3328 |

OTHER PUBLICATIONS

European Patent Office; International Search Report and Written Opinion issued in Application No. PCT/US2024/019528; 13 pages; dated Jun. 20, 2024.

* cited by examiner

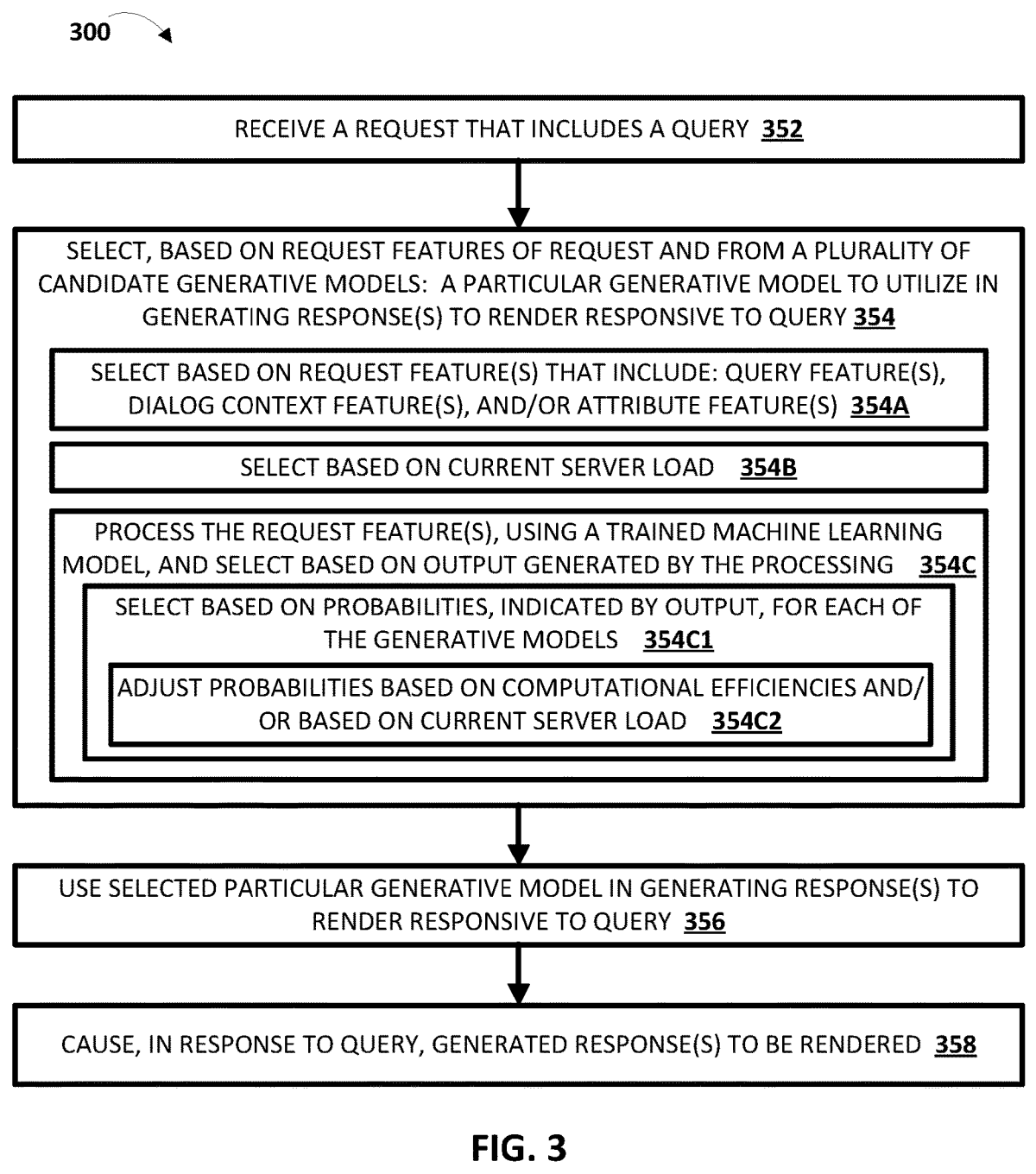

300

RECEIVE A REQUEST THAT INCLUDES A QUERY 352

SELECT, BASED ON REQUEST FEATURES OF REQUEST AND FROM A PLURALITY OF CANDIDATE GENERATIVE MODELS: A PARTICULAR GENERATIVE MODEL TO UTILIZE IN GENERATING RESPONSE(S) TO RENDER RESPONSIVE TO QUERY 354

SELECT BASED ON REQUEST FEATURE(S) THAT INCLUDE: QUERY FEATURE(S), DIALOG CONTEXT FEATURE(S), AND/OR ATTRIBUTE FEATURE(S) 354A

SELECT BASED ON CURRENT SERVER LOAD 354B

PROCESS THE REQUEST FEATURE(S), USING A TRAINED MACHINE LEARNING MODEL, AND SELECT BASED ON OUTPUT GENERATED BY THE PROCESSING 354C

SELECT BASED ON PROBABILITIES, INDICATED BY OUTPUT, FOR EACH OF THE GENERATIVE MODELS 354C1

ADJUST PROBABILITIES BASED ON COMPUTATIONAL EFFICIENCIES AND/ OR BASED ON CURRENT SERVER LOAD 354C2

USE SELECTED PARTICULAR GENERATIVE MODEL IN GENERATING RESPONSE(S) TO RENDER RESPONSIVE TO QUERY 356

CAUSE, IN RESPONSE TO QUERY, GENERATED RESPONSE(S) TO BE RENDERED 358

FIG. 3

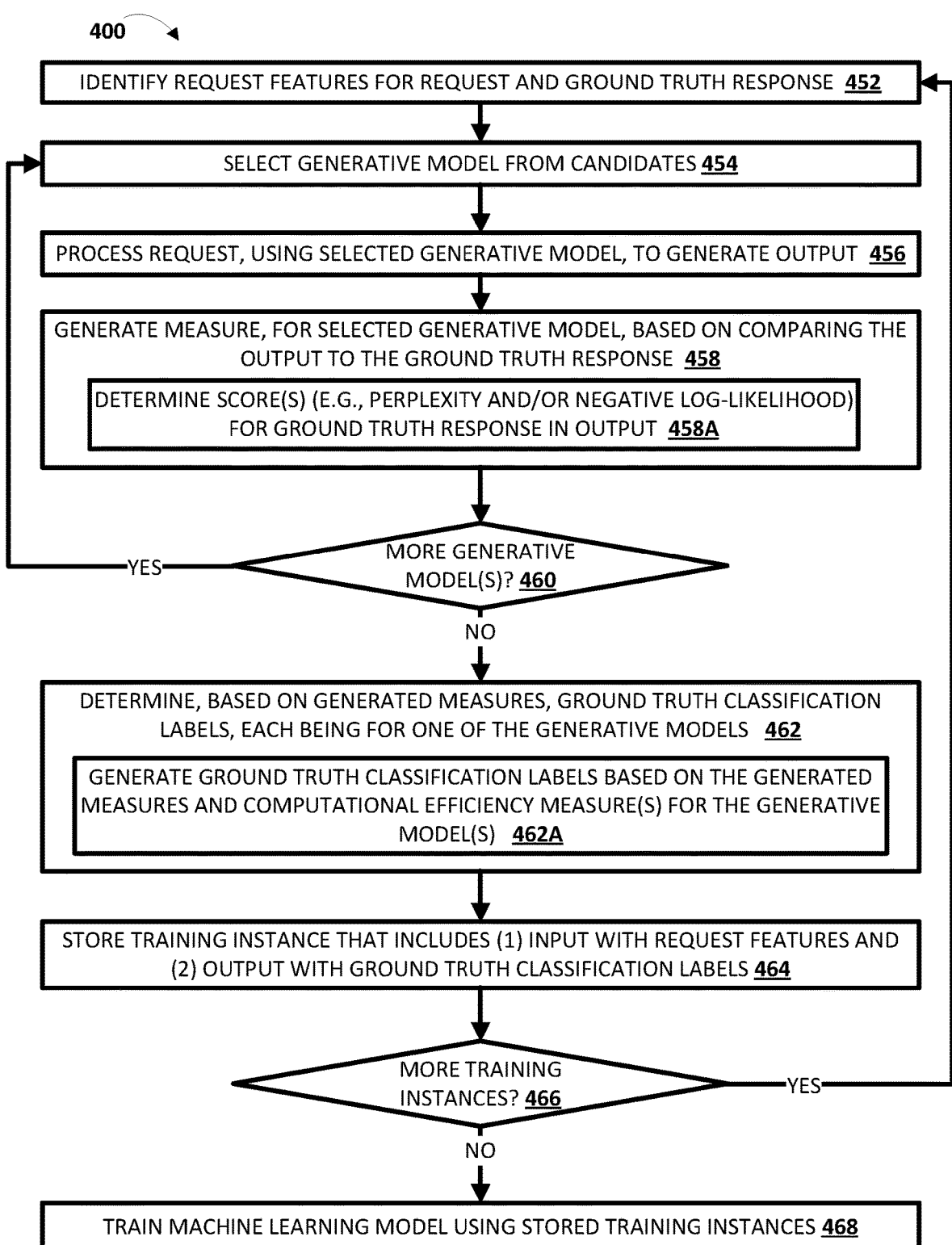

400

IDENTIFY REQUEST FEATURES FOR REQUEST AND GROUND TRUTH RESPONSE  452

SELECT GENERATIVE MODEL FROM CANDIDATES 454

PROCESS REQUEST, USING SELECTED GENERATIVE MODEL, TO GENERATE OUTPUT  456

GENERATE MEASURE, FOR SELECTED GENERATIVE MODEL, BASED ON COMPARING THE OUTPUT TO THE GROUND TRUTH RESPONSE  458

DETERMINE SCORE(S) (E.G., PERPLEXITY AND/OR NEGATIVE LOG-LIKELIHOOD) FOR GROUND TRUTH RESPONSE IN OUTPUT  458A

MORE GENERATIVE MODEL(S)? 460

YES

NO

DETERMINE, BASED ON GENERATED MEASURES, GROUND TRUTH CLASSIFICATION LABELS, EACH BEING FOR ONE OF THE GENERATIVE MODELS  462

GENERATE GROUND TRUTH CLASSIFICATION LABELS BASED ON THE GENERATED MEASURES AND COMPUTATIONAL EFFICIENCY MEASURE(S) FOR THE GENERATIVE MODEL(S)  462A

STORE TRAINING INSTANCE THAT INCLUDES (1) INPUT WITH REQUEST FEATURES AND (2) OUTPUT WITH GROUND TRUTH CLASSIFICATION LABELS 464

MORE TRAINING INSTANCES? 466

YES

NO

TRAIN MACHINE LEARNING MODEL USING STORED TRAINING INSTANCES 468

FIG. 4

DYNAMIC SELECTION FROM AMONG MULTIPLE CANDIDATE GENERATIVE MODELS WITH DIFFERING COMPUTATIONAL EFFICIENCIES

BACKGROUND

Various generative models have been proposed that can be used to process natural language (NL) content and/or other input(s), to generate output that reflects generative content that is responsive to the input(s). For example, large language models (LLM(s)) have been developed that can be used to process NL content and/or other input(s), to generate LLM output that reflects generative NL content and/or other generative content that is responsive to the input(s). For instance, an LLM can be used to process NL content of "how to change DNS settings on Acme router", to generate LLM output that reflects several responsive NL sentences such as: "First, type the router's IP address in a browser, the default IP address is 192.168.1.1. Then enter username and password, the defaults are admin and admin. Finally, select the advanced settings tab and find the DNS settings section". However, current utilizations of generative models suffer from one or more drawbacks.

As one example, many generative models can be of a very large size, often including billions of parameters (e.g., over 100 billion parameters, over 250 billion parameters, or over 500 billion parameters). Due to the large size of such a generative model, significant memory, processor, power, and/or other computational resource(s) can be required to process an input, using the generative model, to generate a corresponding generative output. This resource utilization can be significant on a per input basis, and very significant when hundreds or thousands of inputs are being processed per minute, per second, or other interval. Also, due to the large size of such a generative model, there can be significant latency in generating a corresponding generative output and, as a result, in rendering corresponding generative content. Such latency can lead to prolonging of a user-to-computer interaction.

Smaller size counterparts to such generative models do exist, such as a separately trained counterpart with less parameters or a pruned and/or quantized counterpart generated from applying one or more pruning techniques and/or one or more quantization techniques to the larger counterpart. For example, a smaller counterpart to a larger model can include 25%, 33%, 50%, 66% or other percentage less parameters than the larger model. However, such smaller size counterparts can be less robust and/or less accurate than their larger size counterparts. Accordingly, while utilizing such a smaller size counterpart to process an input can be more computationally efficient and/or can be performed with less latency, there is a greater risk that corresponding generative output, generated by processing the input, can be inaccurate and/or under-specified.

SUMMARY

Implementations disclosed herein are directed to selecting, in response to receiving a request and from among multiple candidate generative models with differing computational efficiencies, a particular generative model to utilize in generating a response to the request. Those implementations reduce latency and/or conserve computational resource(s) through selection, for various requests, of a more computationally efficient generative model for utilization in lieu of a less computationally efficient generative model.

Further, those implementations seek to achieve such benefits, through utilization of more computationally efficient generative models, while also still selectively utilizing less computationally efficient generative models for certain requests to mitigate occurrences of a generated response being inaccurate and/or under-specified. This, in turn, can mitigate occurrences of computational and/or network inefficiencies that result from a user issuing a follow-up request to cure the inaccuracies and/or under-specification of a generated response.

As a non-limiting working example, assume that the candidate generative models include a larger LLM that includes over 200 billion parameters and a smaller LLM that includes twenty, thirty, forty, fifty, or other percent less parameters than the larger LLM. For instance, the smaller LLM can include less than 100 billion parameters. In some implementations, the smaller LLM can be a quantized and/or pruned version of the larger LLM. In some other implementations, the smaller LLM is not a quantized and/or pruned version of the larger LLM but, instead, is wholly independent of the larger LLM. For example, the smaller LLM can have a different architecture relative to the larger LLM and/or can be trained on a unique set of training data relative to the larger LLM. For instance, the input dimensions of the smaller LLM can be smaller than those of the larger LLM, the output dimensions of the smaller LLM can be smaller than those of the larger LLM, and/or the smaller LLM can include various intermediate layers that vary in size and/or type relative to those of the larger LLM.

Continuing with the working example, the smaller LLM can be more computationally efficient than the larger LLM. For example, processing a request utilizing the smaller LLM can occur with less latency than processing the request utilizing the larger LLM and/or processing the request utilizing the smaller LLM can utilize less memory, processor, and/or power resource(s) than processing the request utilizing the larger LLM. For many requests, utilizing either the smaller LLM or the larger LLM to process the request and generate corresponding LLM output results in a similar (or even the same) response being generated. Accordingly, for such requests, utilizing the smaller LLM in lieu of the larger LLM would result in a response being generated that is semantically similar (or even the same) to one that would have been generated had the larger LLM instead been utilized. Such a response can be rendered in response to the request and will satisfy the informational needs of the request. However, for other requests, utilizing the smaller LLM to process the request and generate output results in a response being generated that is inaccurate and/or under-specified. On the other hand, processing many of such requests utilizing the larger LLM to generate output results in an alternate response being generated that is accurate and that is not under-specified. Accordingly, for such requests, utilizing the larger LLM model is desirable. Further, utilizing the larger LLM model for such requests can result in computational efficiencies for the user-to-computer interactions, associated with those requests, as a whole. For example, utilizing the larger LLM model for such requests mitigates occurrences of computational and/or network inefficiencies that result from a corresponding user issuing a follow-up request to cure the inaccuracies and/or under-specification of a generated response and/or from a user performing further action(s) based on an inaccurate and/or under-specified response.

In view of these and other considerations, and continuing with the working example, implementations disclosed herein can dynamically select, between at least the smaller LLM and the larger LLM, on a request-by-request basis to achieve reduced latency and/or improved computational efficiency, while mitigating occurrences of any inaccurate and/or under-specified responses. Some of those implementations can, in selecting between at least the smaller LLM and the larger LLM for a given request, make the selection based on considering request feature(s) of the request, measured or expected current server load, and/or the respective computational efficiencies of the smaller LLM and the larger LLM.

As one example, the request feature(s) can be processed to generate a first measure for the smaller LLM and a second measure for the second LLM, where the first measure characterizes a probability of generating a correct response (e.g., a response that is of high quality and/or high relevance) to the request using the smaller LLM, and where second measure characterizes a predicted probability of generating a correct response to the request using the larger LLM. For example, the first measure can characterize a probability that using the smaller LLM will generate a response that is relevant and/or of high quality, and the second measure can characterize a probability that using the larger LLM will generate a response that is relevant and/or of high quality. The selection between the smaller and larger LLMs can then be made based on the first and second measures, optionally also considering current server load and/or the respective computational efficiencies of the smaller and larger LLMs. For example, assume the measures are each from 0 to 1, with 1 being most indicative of generating a correct response. In view of the greater computational efficiency of the smaller LLM, and to encourage computational efficiency, the smaller LLM can be selected when the first measure satisfies an absolute threshold and/or satisfies a threshold relative to the second measure. For instance, the smaller LLM can be selected over the larger LLM: (a) when the first measure is greater than a lower bound absolute threshold (e.g., 0.1) and when the first measure is within 50% of the second measure; and/or (b) when the first measure is greater than an upper bound absolute threshold (e.g., 0.4) (optionally without consideration of the second measure). Optionally, the threshold(s) can be adjusted, and/or the first and second measure(s) adjusted, in dependence on the current server load. For example, when the current server load indicates a high magnitude of resource utilization, the smaller LLM can be selected over the larger LLM: (a) when the first measure is greater than 0.1 and when the first measure is within 60% of the second measure. On the other hand, when the current server load indicates a low magnitude of resource utilization, the smaller LLM can be selected over the larger LLM: (a) when the first measure is greater than 0.2 and when the first measure is within 45% of the second measure. Put another way, when the current server load indicates a low magnitude of resource utilization, the criteria can be adjusted such that the smaller LLM is less likely to be selected and the larger LLM is more likely to be selected, relative to criteria utilized when the current server load indicates a high magnitude of resource utilization. More generally, criteria utilized in the selection process can be dynamically adjusted, in dependence on server load, to more heavily bias selection toward more computationally efficient LLM(s) during periods of high server load, relative to any bias toward more computationally efficient LLM(s) (if any) that occurs during periods of low server load.

The request feature(s), that are considered in selecting between at least the smaller LLM and the larger LLM for a given request, can include query feature(s) of a query included in the request, dialog context features that are based on prior request(s) and/or prior response(s) of an ongoing dialog in which the request is provided, and/or attribute feature(s) associated with a client device and/or user that initiated the request. For example, when the request includes a natural language query (e.g., automatically generated or generated based on user interface input), the query feature(s) can include: term(s) of the query; an embedding of term(s) of the query (e.g., generated using a separate encoder); topic(s) or domain(s) reflected by the query; and/or other feature(s) derivable from the query. As another example, when the request includes a query with an image, the query feature(s) can include: an automatically generated caption of the image; descriptor(s) of object(s) automatically detected in the image; and/or other feature(s) derivable from the image.

As yet another example, when the request is provided as part of an ongoing dialog (e.g., within a threshold time of a prior request from the same device and/or of a corresponding response), the request can include (or can be used to identify) prior request(s) and/or prior response(s) of the dialog, and the dialog context feature(s) can be generated based on the prior request(s) and/or prior response(s). For instance, the dialog context features can include: term(s) of the prior request(s) and/or prior response(s); embedding(s) of the prior request(s) and/or prior response(s); and/or other feature(s) derivable from the prior request(s) and/or prior response(s).

As yet another example, when the request includes an attribute identifier, such as token(s) and/or other identifier(s) that indicate one or more properties of a client device and/or user that initiated the request, attribute feature(s) can be generated based on the attribute identifier. For example, the attribute identifier can indicate, directly or with reference to a separate data structure, a tier of the client device and/or the user associated with the request. The tier can be one of multiple candidate tiers and can influence the LLM selection. For instance, a first tier (e.g., a free tier without ads) can cause biasing selection more heavily toward the smaller LLM, a second tier (e.g., a paid tier) can cause biasing selection more heavily toward the larger LLM, and a third tier (e.g., a free tier with ads) can not cause any biasing or can bias selection toward the larger LLM (but less so than does the second tier).

In some implementations and/or for some requests, a trained machine learning (ML) model (e.g., a neural network model) can be used in selecting from among multiple candidate generative models (e.g. from between at least the smaller LLM and the larger LLM). The trained ML model is more computationally efficient than at least some of the candidate generative models. For example, the trained ML model can be more computationally efficient than at least half of the candidate generative models or more computationally efficient than all of the candidate generative models. For instance, the trained ML model can include 25%, 33%, 50%, 66% or other percentage less parameters than one or more (e.g., all) of the candidate generative models. As a particular example, the smallest candidate generative model can have at least one billion parameters, and the trained ML model can include 25%, 33%, 50%, 66% or other percentage less parameters than the smallest candidate generative model. More generally, the computational resources saved through selections made, using the trained ML model, will be greater than the computational resources utilized in utilizing the trained ML model in making those selections.

In some of those implementations, at least the query feature(s) can be processed, using the ML model, to generate output that indicates, for each of the candidate generative models, a corresponding probability of generating a correct response. For example, the output can include a first probability for a first candidate generative model, a second probability for a second of the candidate generative models, a third probability for a third of the candidate generative models, etc. Further, the probabilities can be used in selecting between the candidate generative models, optionally also considering current server load and/or the respective computational efficiencies of the candidate generative models.

In some implementations, the ML model is trained based on training instances that include (a) training instance input that includes at least request features for a request, and (b) ground truth classification labels that are each for a corresponding one of the candidate generative models. In some of those implementations, the ground truth classification labels for the training instance are generated by, for each of the candidate generative models: processing the request (corresponding to the request features of the training instance input), using the candidate generative model, to generate corresponding output; and generating a corresponding measure, for the generative model, by comparing the corresponding output to the ground truth response. For example, the measure for a first LLM can be based on first score(s) that are each generated based on comparing the ground truth response to first LLM output, for the first LLM, generated based on processing the request using the first LLM. Likewise, the measures for a second LLM can be based on second score(s) that are each generated based on comparing the ground truth response to second LLM output, for the second LLM, generated based on processing the request using the second LLM. The score(s) generated based on comparing the ground truth response to given LLM output can be generated based on how closely the given LLM output conforms to the ground truth response. For instance, the score(s) can include a negative log-likelihood score and/or a perplexity score. Those and/or other score(s) can optionally be generated based on comparing the ground truth response to a given sequence of probability distributions over a vocabulary that is reflected in the given LLM output (e.g., generated as a function of the probabilities for the ground truth response in the probability distributions).

The ground truth classification labels, for the training instance, can then be generated as a function of all of the measures for all of the candidate generative models. For example, the ground truth classification labels can be soft labels that are generated based on a normalization of the measures. For instance, assume the measures are [0.5, 0.6, 0.4, 0.3], where 0.5 is the measure for a first candidate generative model, 0.6 is the measure for a second candidate generative model, etc. In such an instance the normalized soft labels can be [0.278, 0.333, 0.222 0.167]. As another example, the ground truth classification labels can be hard labels (e.g., one-hot classification labels where each label is a 0 or 1, with only one of the labels being a 1 (or other hot/positive value). For instance, if the measures are [0.5, 0.6, 0.4, 0.3], the hard labels can be [0, 1, 0, 0]. The hot/positive value is provided for the second candidate generative model based on 0.6 being the best measure of the group.

In some implementations, determining the ground truth classification labels can be further based on corresponding computational efficiency measures for the generative models. Generally, this can include, for more computationally efficient generative model(s), boosting the soft label magnitude and/or boosting the likelihood of a hot/positive hard label being assigned. This can additionally or alternatively include, for less computationally efficient generative model(s), decreasing the soft label magnitude and/or decreasing the likelihood of a hot/positive label being assigned. In these and other manners, the ground truth classification labels are generated so that they are adjusted in dependence on, and optionally proportionally to, the computational efficiencies of the generative models. This causes the ML model, when trained on such labels, to generate predicted labels that bias toward selection of more computational efficient generative model(s). This can result in a lower rate of selection of less computationally efficient generative model(s), since their training labels were decreased or not boosted. Accordingly, using the ML model when trained on such labels, increases the computational efficiencies of implementations disclosed herein, while still enabling selection of the less computationally efficient generative model(s) when they are likely to generate meaningfully improved output. It is noted that training the ML model based on the ground truth classification labels that are a function of corresponding computational efficiency measures results in the ML model, when trained and utilized, generating predicted labels that already account for the computational efficiency measures. This can obviate the need to account, at run time, for computational efficiencies by adjusting predicted labels after their generation using the ML model and/or by comparing the predicted labels to different threshold(s). However, adjusting the predicted labels and/or comparing them to different threshold(s) can still optionally occur at run time, optionally to account for current server load.

As one non-limiting example of determining ground truth labels as a function of corresponding computational efficiency measures for generative models, assume that the measures are [0.5, 0.6, 0.4, 0.3] and are for [LLM1, LLM2, LLM3, and LLM4]. Further assume LLM1 has 25 billion parameters, LLM2 has 50 billion parameters, LLM3 has 150 billion parameters, and LLM4 has 250 billion parameters. The measures can be adjusted by corresponding factors that are each based on measured or predicted computational efficiencies of their corresponding LLM. For example, the adjustment factors can be [2.0, 1.0, 0.7, and 0.5], resulting in adjusted measures of [1.0, 0.6, 0.28, 0.15]. Accordingly, the adjusted measures would result in ground truth classification hard labels of [1, 0, 0, 0], whereas the hard labels for the unadjusted measures would instead be [0, 1, 0, 0]. Likewise, the adjusted measures would result in ground truth classification soft labels of [0.493, 0.296, 0.137, 0.074], whereas the soft labels for the unadjusted measure would instead be [0.278, 0.333, 0.222 0.167].

Regardless of the techniques utilized in generating the ground truth classification labels, training instances can be generated that each include (a) training instance input that includes the request features and (b) training instance output that includes the ground truth classification labels. Further, the ML model can be trained based on such training instances and, once trained, utilized in selection of generative models for requests. As described herein, the ground truth classification labels that are included in a training instance output can be hard labels or soft labels, and can optionally be generated based on computational efficiencies of the corresponding generative models. The request features, that are included in a training instance input, can include query feature(s) of a query included in the request, dialog context features that are based on prior request(s) and/or prior response(s) of an ongoing dialog in which the request was provided, attribute feature(s) associated with the request, and/or other feature(s) related to the request.

In some implementations, an LLM can include at least hundreds of millions of parameters. In some of those implementations, the LLM includes at least billions of parameters, such as one hundred billion or more parameters. In some additional or alternative implementations, an LLM is a sequence-to-sequence model, is Transformer-based, and/or can include an encoder and/or a decoder. One non-limiting example of an LLM is GOOGLE'S Pathways Language Model (PaLM). Another non-limiting example of an LLM is GOOGLE'S Language Model for Dialogue Applications (LaMDA).

The preceding is presented as an overview of only some implementations disclosed herein. These and other implementations are disclosed in additional detail herein. For example, additional and/or alternative implementations are disclosed herein such as those directed to automatically linkifying generated NL based summaries, determining confidence measure(s) for NL based summaries and determining whether to and/or how to render NL based summaries based on the confidence measure(s), and/or determining whether to utilize one, none, or multiple LLM(s) in processing a query.

BRIEF DESCRIPTION OF THE DRAWINGS

FIG. 3 depicts a flowchart illustrating an example method of selecting, in response to receiving a request and from among multiple candidate generative models with differing computational efficiencies, a particular generative model to utilize in generating a response to the request.

FIG. 4 depicts a flowchart illustrating an example method of generating training instances for training a machine learning model that can be utilized in selecting between multiple candidate generative models for a request, and training the machine learning model.

DETAILED DESCRIPTION

Figure 1:
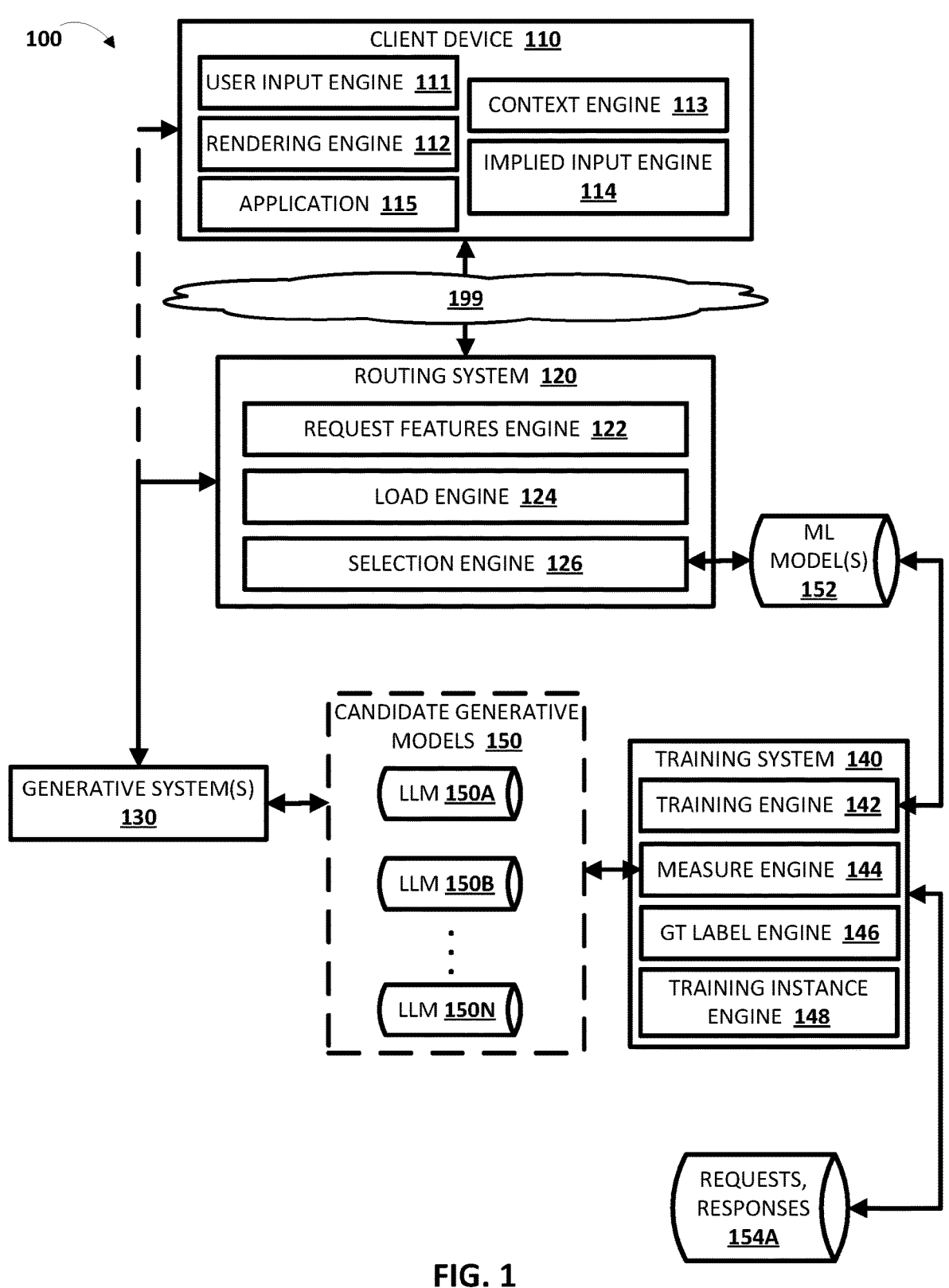
FIG. 1 depicts a block diagram of an example environment that demonstrates various aspects of the present disclosure, and in which some implementations disclosed herein can be implemented.

Turning now to FIG. 1, a block diagram of an example environment 100 that demonstrates various aspects of the present disclosure, and in which implementations disclosed herein can be implemented is depicted. The example environment 100 includes a client device 110, a routing system 120, generative system(s) 130, and a training system 140. The example environment 100 further includes ML model(s)

152 that can optionally be used by the routing system 120, candidate generative models 150 that are utilized by the generative system(s) 130, and requests, responses database 154 that can optionally be used by the training system 140 in training the ML model(s) 152.

The candidate generative models 150 of FIG. 1 include LLM 150A, LLM 150B, and LLM 150N. In some implementations, only two candidate generative models are included among the candidate generative models 150. In other implementations, more than three candidate generative models can be included among the candidate generative models 150, as indicated by the vertical ellipsis in FIG. 1. Each of the candidate generative models 150 can have differing computational efficiencies. As a non-limiting example, LLM 150A can have less than 100 billion parameters, LLM 150A can have between 100 billion and 250 billion parameters, and LLM 150N can have over 250 billion parameters. Although LLMs 150A, 150B, and 150N are illustrated as included in the candidate generative models 150 in FIG. 1, additional or alternative generative models can be included such as text-to-image diffusion model(s).

Although illustrated separately, in some implementations all or aspects of routing system 120 and generative system(s) 130 can be implemented as part of a cohesive system. For example, the same entity can be in control of both the routing system 120 and generative system(s) 130, and implement them cohesively. However, in some implementations the routing system 120 and one or more of the generative system(s) 130 can be controlled by separate parties. In some of those implementations, the routing system 120 can interface with such generative system(s) utilizing, for example, application programming interface(s) (APIs) of such generative system(s). For example, the routing system 120 can transmit, using an API of a generative system, a request and an indication of which LLM is to be utilized in processing the request.

In some implementations, all or aspects of the routing system 120 can be implemented locally at the client device 110. In additional or alternative implementations, all or aspects of the routing system 120 can be implemented remotely from the client device 110 as depicted in FIG. 1 (e.g., at remote server(s)). In those implementations, the client device 110 and the routing system 120 can be communicatively coupled with each other via one or more networks 199, such as one or more wired or wireless local area networks ("LANs," including Wi-Fi LANs, mesh networks, Bluetooth, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more applications, such as application 115, via which queries, that are included in requests, can be submitted and/or via which responses generated by generative model(s) (e.g., LLM(s)) and/or other response(s) to the requests can be rendered (e.g., audibly and/or visually). The application 115 can be an application that is separate from an operating system of the client device 110 (e.g., one installed "on top" of the operating system)—or can alternatively be implemented directly by the operating system of the client device 110. For example, the application 115 can be a web browser installed on top of the operating system, or can be an application that is integrated as part of the operating system functionality. The application 115 can interact with the routing system 120 and/or the generative system(s) 130.

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to touch input directed to the client device 110. Some instances of a query described herein, that can be included in a request, can be a query that is formulated based on user input provided by a user of the client device 110 and detected via user input engine 111. For example, the query can be a typed query that is typed via a physical or virtual keyboard, a suggested query that is selected via a touch screen or a mouse, a spoken voice query that is detected via microphone(s) of the client device, or an image query that is based on an image captured by a vision component of the client device.

In various implementations, the client device 110 can include a rendering engine 112 that is configured to provide content (e.g., a natural language based response generated by an LLM) for audible and/or visual presentation to a user of the client device 110 using one or more user interface output devices. For example, the client device 110 can be equipped with one or more speakers that enable content to be provided for audible presentation to the user via the client device 110. Additionally, or alternatively, the client device 110 can be equipped with a display or projector that enables content to be provided for visual presentation to the user via the client device 110.

In various implementations, the client device 110 can include a context engine 113 that is configured to determine a context (e.g., current or recent context) of the client device 110 and/or of a user of the client device 110. In some of those implementations, the context engine 113 can determine a context utilizing current or recent interaction(s) via the client device 110, a location of the client device 110, profile data of a profile of a user of the client device 110 (e.g., an active user when multiple profiles are associated with the client device 110), and/or other data accessible to the context engine 113. For example, the context engine 113 can determine a current context based on a current state of a query session (e.g., considering one or more recent queries of the query session), profile data, and/or a current location of the client device 110. For instance, the context engine 113 can determine a current context of "looking for a healthy lunch restaurant in Louisville, Kentucky" based on a recently issued query, profile data, and a location of the client device 110. As another example, the context engine

113 can determine a current context based on which application is active in the foreground of the client device 110, a current or recent state of the active application, and/or content currently or recently rendered by the active application. A context determined by the context engine 113 can be utilized, for example, as all or part of dialog context described herein. A context determined by the context engine 113 can additionally or alternatively be utilized, for example, in supplementing or rewriting a query that is formulated based on user input, in generating an implied query (e.g., a query formulated independent of user input), and/or in determining to submit an implied query and/or to render result(s) (e.g., an LLM generated response) for an implied query.

In various implementations, the client device 110 can include an implied input engine 114 that is configured to: generate an implied query independent of any user input directed to formulating the implied query; to submit a request that includes the implied query, optionally independent of any user input that requests submission of the request; and/or to cause rendering of a response for an implied query, optionally independent of any user input that requests rendering of the response. For example, the implied input engine 114 can use current context, from current context engine 113, in generating an implied query, determining to submit a request that includes the implied query, and/or in determining to cause rendering of a response for the implied query. For instance, the implied input engine 114 can automatically generate and automatically submit an implied query based on the current context. Further, the implied input engine 114 can automatically push a response to the implied query to cause the response to be automatically rendered or can automatically push a notification of the response, such as a selectable notification that, when selected, causes rendering of the response. As another example, the implied input engine 114 can generate an implied query based on profile data (e.g., an implied query related to an interest of a user), submit the query at regular or non-regular intervals, and cause a corresponding response to be automatically provided (or a notification thereof automatically provided).

Further, the client device 110, the routing system 120, the generative system(s) 130, and/or the training system 140 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device 110 having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household).

Routing system 120 is illustrated as including a request features engine 122, a load engine 124, and a selection engine 126. Some of the engines can be omitted in various implementations.

The request features engine 122 can, in response to receiving a request, from client device 110 or other client device, generate request feature(s) for the request. The request feature(s) can include query feature(s) of a query included in the request, such as query features that are based on term(s) of a natural language query included in the request. The request features can additionally or alternatively include dialog context features that are based on prior request(s) and/or prior response(s) of an ongoing dialog in which the request is provided. One or more of the dialog context features, the prior response(s), and/or the prior request(s) can be included as part of the request (e.g., generated by the context engine 113). Additionally or alternatively, one or more of the dialog context features, the prior response(s), and/or the prior request(s) may not be included as part of the request, but the request features engine 122 can retrieve them (e.g., from remote storage accessible by the routing system 120) using the request (e.g., using an attribute identifier of the request). The request features can additionally or alternatively include attribute feature(s) associated with a client device and/or user that initiated the request. For example, the request can include an attribute identifier and the request features engine 122 can generate attribute feature(s) using the attribute identifier.

The load engine 124 determines a current server load, which can be a measured or expected/predicted server load. The current server load characterizes a magnitude of computational resource utilization being experienced by one or more (e.g., all) of the generative system(s) 130. The load engine 124 can utilize one or more techniques in determining the current server load. For example, the load engine 124 can communicate with the generative system(s) 130 and obtain, from the generative system(s) 130, the current server load directly or current metric(s) that can be utilized by the load engine to determine the current server load. As another example, the load engine 124 can predict the current server load based on a quantity of recent requests processed by the routing system 120 and, optionally, the selections made by the routing system 120 for those recent requests. For instance, the load engine 124 can predict a higher current server load if 1,000 requests were processed by the routing system 120 in the last second as compared to if only 500 requests were processed by the routing system 120 in the last second. Also, for instance, the load engine 124 can predict a higher current server load if 1,000 requests were processed by the routing system 120 in the last second and 33% were selected for handling by the least computationally efficient of the candidate generative models 150 as compared to if 1,000 requests were processed by the routing system 120 in the last second and only 5% were selected for handling by the least computationally efficient of the candidate generative models 150.

The selection engine 126 utilizes the request features, generated by the request features engine 122 for a request, to select which, if any, of the multiple candidate generative models 150 should be utilized in responding to the request. The selection engine 126 can optionally additionally utilize the current load, determined by the load engine 124, in selecting which, if any, of the multiple candidate generative models 150 should be utilized in responding to the request.

For example, the selection engine 126 can, for a first request, select only LLM 150A for utilization in responding to the first request and can, for a second request, select only LLM 150B for utilization in responding to the second request. The differing selections can be based on considering differing first request features for the first request and second request features for the second request—and/or based on considering differing current loads at a first time of the first request and a second time of the second request.

As one particular example, the selection engine 126 can process request feature(s) of a request to generate a first measure for LLM 150A, a second measure for LLM 150B, an nth measure for LLM 150N, and optionally additional measure(s) for additional LLM(s) and/or other generative models (indicated generally by the vertical ellipsis in FIG. 1). Each of the generated measures characterizes a corresponding probability of generating a correct response to the request using the corresponding generative model. The selection engine 126 can then select only one (or even none in some situations) of the candidate generative models based on the generated measures, optionally also considering current server load as determined by the load engine 124 and/or the respective computational efficiencies of the candidate generative models.

The request feature(s), that are considered by the selection engine 126 in selecting among the candidate generative models 150, can include query feature(s) of a query included in the request, dialog context features that are based on prior request(s) and/or prior response(s) of an ongoing dialog in which the request is provided, and/or attribute feature(s) associated with a client device and/or user that initiated the request.

In some implementations and/or for some requests, the selection engine 126 utilizes ML model(s) 152 (e.g., a trained neural network model) in selecting from among the candidate generative models 150. The ML model(s) 152 utilized by the selection engine 126 are more computationally efficient than at least some of the candidate generative models 150. In some of those implementations, the selection engine 126 processes at least the request feature(s) (determined by the request features engine 122) for a request, using the ML model(s) 152, to generate output that indicates, for each of the candidate generative models 150, a corresponding probability of generating a correct response. For example, the output can include a first probability for LLM 150A, a second probability for LLM 150B, an nth probability for LLM 150N, etc. The measures, considered by the selection engine 126, can be based on (e.g., strictly conform to) the corresponding probabilities. Further, the current server load and/or the respective computational efficiencies of the candidate generative models can also be considered by the selection engine 126 in making the selection.

The selection engine 126 can provide, to one of the generative system(s) 130, an indication of the selected generative model. The request can also be provided, in conjunction with the indication of the selection, to one of the generative system(s) by the routing system or by the client device 110 directly.

The generative system(s) 130, in response to receiving a request and an indication of a selected generative model, processes the request using the selected generative model to generate generative output. The generative system(s) 130 utilize the selected generative model for the request based on receiving the indication of the selected generative mode in conjunction with the request, and can utilize the selected generative model without utilizing any other available generative model in processing the request. Further, the generative system(s) 130 generate a response, based on the generative output, and cause the response to be rendered at the client device 110 and to be rendered responsive to the request. For example, the generative system(s) can transmit the response to the client device 110 directly for rendering, or can transmit the response to the routing system 120, which then transmits the response to the client device 110 for rendering.

As a particular example, the generative system(s) 130 can, in response to a first request and an indication of LLM 150A, process the first request using only LLM 150A to generate first LLM output, generate a first response based on the first LLM output, and cause the first response to be rendered by the client device 110 in response to the first request. Further, the generative system(s) 130 can, in response to a second request and an indication of LLM 150B, process the first request using only LLM 150B to generate second LLM output, generate a second response based on the second LLM output, and cause the second response to be rendered by the client device 110 in response to the second request. Notably, in generating the first response the generative system(s) 130 can utilize the LLM 150A without any utilization of any other of the candidate generative models 150. Likewise, in generating the second response the generative system(s) 130 can utilize the LLM 150B without any utilization of any other of the candidate generative models 150.

The training system 140 can be used to train the ML model(s) 152 that can be utilized by the selection engine 126 in generating probabilities and/or other measures that the selection engine 126 utilizes in making selections. The training system is illustrated as including a training engine 142, a measure engine 144, a ground truth (GT) label engine 146, and a training instance engine 148.

The training instance engine 148 can work in cooperation with the measure engine 144 and the GT label engine 146 in generating training instances that each include (a) training instance input that includes at least request features for a request, and (b) ground truth classification labels that are each for a corresponding one of the candidate generative models 150. The training engine 142 can then utilize the training instances, generated by the training instance engine 148, in training the ML model(s) 152.

In generating a training instance, the training instance engine 148 can identify, from requests, responses database 154, a request and a ground truth response for the request. For example, the ground truth response for the request can be one that was formulated by a human and/or that was verified by human rater(s) as being an appropriate response to the request. The measure engine 144 can, for each of the generative models 150, process the identified request using the generative model to generate corresponding output. For example, the measure engine 144 can process the request using LLM 150A to generate first LLM output, process the request using LLM 150B to generate second LLM output, etc. Further, the measure engine 144 can, for each of the generative models 150, generate a measure for the generative model based on comparing the corresponding output to the ground truth response for the request. For example, the measure engine 144 can generate a first measure for the LLM 150A based on comparing the first LLM output to the ground truth response, can generate a second measure for the second LLM 150B based on comparing the second LLM output to the ground truth response, etc.

Further, the GT label engine 146 can generate ground truth classification labels, for the training instance, as a function of all of the measures generated by the measure engine 144. For example, the GT label engine 146 can generate soft ground truth classification labels that are based on a normalization of all of the measures or can generate hard ground truth classification labels based on all of the measures. In some implementations, the GT label engine 146 determines the ground truth classification labels further based on corresponding computational efficiency measures for the generative models 150. For example, for more computationally efficient generative model(s), the GT label engine 146 can boost the soft label magnitude and/or boost the likelihood of a hot/positive hard label being assigned. Also, for example, for less computationally efficient generative model(s), the GT label engine 146 can additionally or alternatively decrease the soft label magnitude and/or decrease the likelihood of a hot/positive label being assigned. It is noted that, in implementations where the GT label engine 146 determines the ground truth classification labels based on corresponding computational efficiency measures, the ML model(s) 152 will be trained to generate output that accounts for and biases toward more computationally efficient generative model(s). This can obviate the need for the selection engine 126 to, when making a selection based on output generated based on processing request features using the trained ML model(s) 152, separately consider computational efficiencies of generative model(s). For example, since the ML model(s) 152 are trained to account for and bias toward more computationally efficient generative model(s), the selection engine 126 can bypass performing post-processing of output, generated using the trained ML model(s) 152, to bias toward more computationally efficient generative model(s).

The training instance engine 148 can then generate a training instance that includes, as training instance input, request features for the request and that includes, as training instance output, the ground truth classification labels generated by the GT label engine 146. As referenced above, the training engine 142 can train the ML model(s) 152 based on such a generated training instance, as well as many additional (e.g., thousands, hundreds of thousands) similarly generated training instances.

Figure 2A:
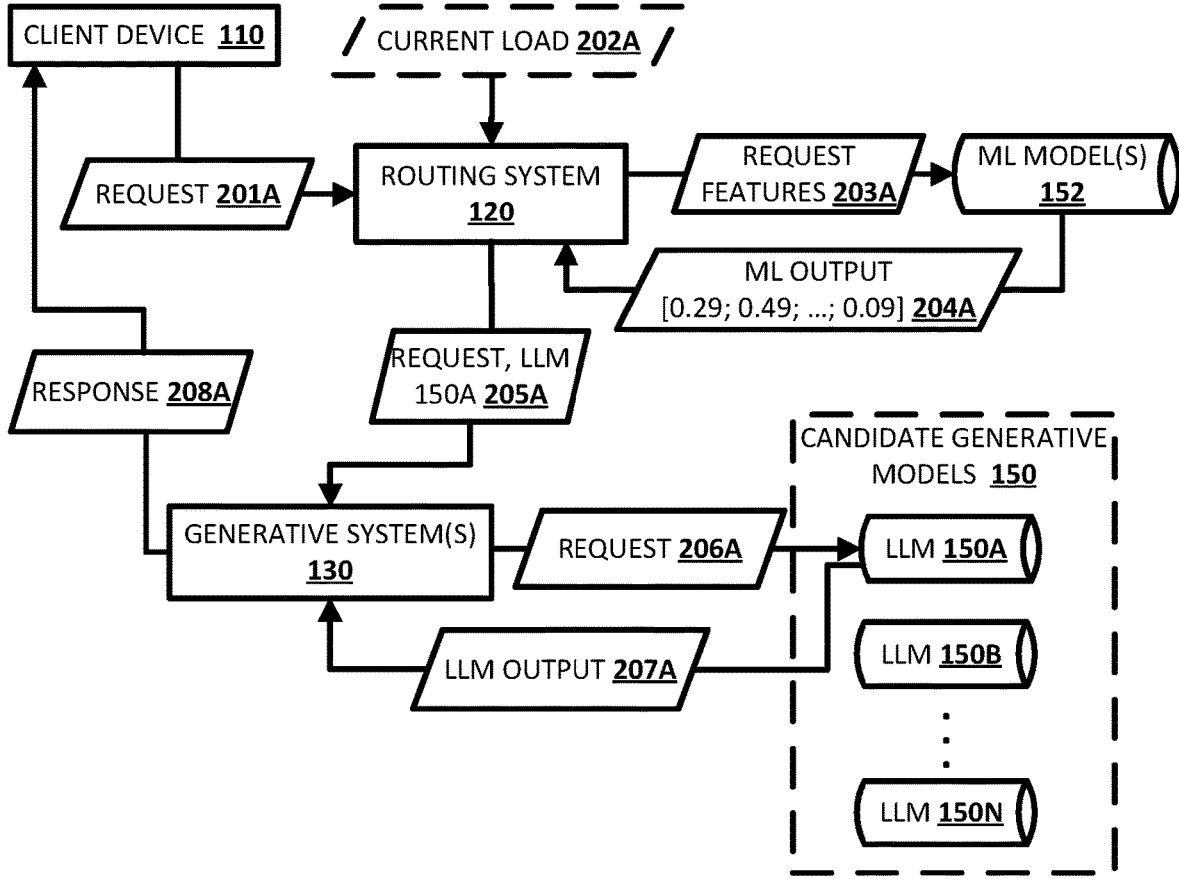
FIG. 2A illustrates an example of interactions, between components of FIG. 1, that can occur in selecting, in response to receiving a request and from among multiple candidate generative models with differing computational efficiencies, a particular generative model to utilize in generating a response to the request.

Turning now to FIG. 2A, an example of interactions, between components of FIG. 1, is illustrated that can occur in selecting, in response to receiving a request 201A and from among multiple candidate generative models 150 with differing computational efficiencies, generative model 150A for utilization in generating a response 208A to the request 201A.

In FIG. 2A, the client device 110 submits the request 201A. The routing system 120 receives the request 201A, generates request features 203A based on the request 201A, and processes the request features 203A using the ML model(s) 152 to generate ML output 204A. In the example of FIG. 2A, the ML output 204A includes a vector of probabilities [0.29; 0.49; . . . ; 0.09], where "0.29" corresponds to LLM 150A, "0.49" corresponds to LLM 150B, "0.09" corresponds to LLM 150N, and " . . . " corresponds to one or more probabilities for one or more other (unillustrated) of the candidate generative models 150. For example, the ML model(s) 152 can include a single ML model that has input dimensions that correspond to the dimensions of the request features 203A and output dimensions that conform to the dimensions of the vector of probabilities. For instance, the single ML model can have a softmax layer, as a final layer, that is used to generate the vector of probabilities.

The routing system 120 uses the ML output 204A and, optionally, a current load 204A to select LLM 150A for utilization in generating a response to the request 201A. It is noted that the probability of "0.29", which corresponds to LLM 150A, in the ML output 204A is less than the probability of "0.49", which corresponds to LLM 150B. Nonetheless, the routing system 120 selects the LLM 150A over the LLM 150B. This can be based on the LLM 150B being less computationally efficient than the LLM 150A and the routing system 120 also considering the current load 202A and/or considering the computational efficiencies of LLM 150A and 150B.

For example, the ML model(s) 152 may not have been trained with ground truth labels that take into account the computational efficiencies of the candidate generative models and, as a result, the routing system 120 may only select the less computationally efficient LLM 150B, over the more computationally efficient LLM 150A, if the probability for LLM 150B is at least double the probability for LLM 150A. In the example of FIG. 2A, the routing system 120 can select LLM 150A since the probability for LLM 150B (0.49) is not at least double the probability for LLM 150A (0.29). As another example, the routing system 120 can be configured to, when the current load is below a first threshold, select the candidate generative model with the highest probability but, when the current load is above a second threshold, select the most computationally efficient model having a probability of at least 0.25 (or other lower bound threshold). In the example of FIG. 2A, the routing system 120 can select LLM 150A since it is most computationally efficient and has a probability (0.29) that is above the lower bound threshold.

The routing system 120 transmits the request and an indication of the LLM 150A 205A to one of the generative system(s) 130. In response, the one of the generative system(s) 130 processes the request 206A using the LLM 150A to generate LLM output 207A. Further, the one of the generative system(s) 130 generates a response 208A based on the LLM output 207A, and transmits the response 208A to the client device 110. Notably, the one of the generative system(s) 130 utilizes the LLM 150A without utilization of any other of the candidate generative models 150. Transmitting the response 208A to the client device 110 causes the client device to render the response responsive to the request 201A.

Figure 2B:
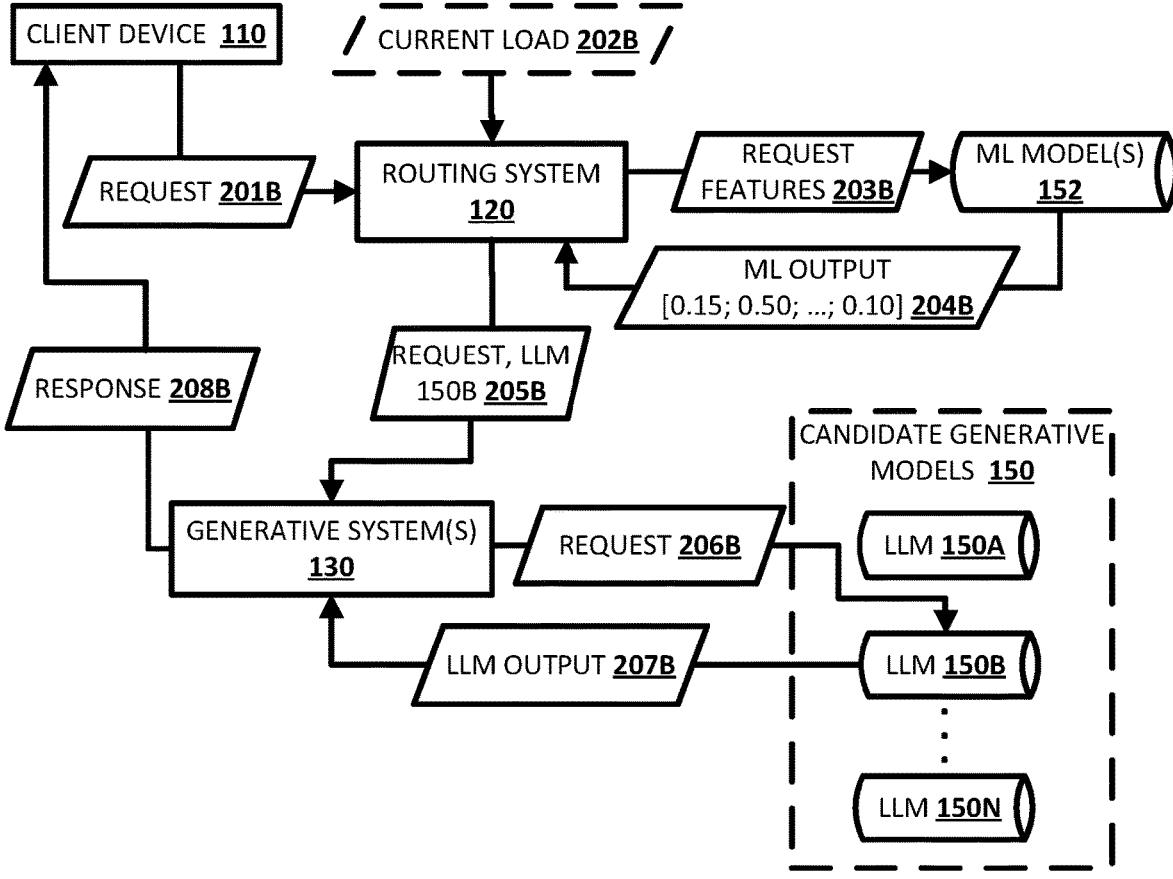
FIG. 2B illustrates an example of interactions, between components of FIG. 1, that can occur in selecting, in response to receiving a different request and from among multiple candidate generative models with differing computational efficiencies, a different particular generative model to utilize in generating a different response to the different request.

Turning now to FIG. 2B, another example of interactions, between components of FIG. 1, is illustrated that can occur in selecting, in response to receiving a different request 201B and from among multiple candidate generative models 150 with differing computational efficiencies, a different particular generative model 150B to utilize in generating a different response to the different request.

In FIG. 2B, the client device 110 submits the request 201B. The routing system 120 receives the request 201B, generates request features 203B based on the request 201B, and processes the request features 203B using the ML model(s) 152 to generate ML output 204B. In the example of FIG. 2B, the ML output 204B includes a vector of probabilities [0.15; 0.50; . . . ; 0.10], where "0.15" corresponds to LLM 150A, "0.50" corresponds to LLM 150B, "0.10" corresponds to LLM 150N, and " . . . " corresponds to one or more probabilities for one or more other (unillustrated) of the candidate generative models 150.

The routing system 120 uses the ML output 204B and, optionally, a current load 204B to select LLM 150B for utilization in generating a response to the request 201A. It is noted that, in the example of FIG. 2B, the probability of "0.50", which corresponds to LLM 150B is the highest probability, and LLM 150B is selected by the routing system 120. Even though LLM 150B is less computationally efficient than LLM 150A, it can still be selected. This can be based on, for example, the ML model(s) 152 having been trained with ground truth labels that take into account the computational efficiencies of the candidate generative models. Put another way, the ML output 204B may have already discounted the lesser efficiency of LLM 150B, but still predicted a probability of 0.50 for LLM 150B.

The routing system 120 transmits the request and an indication of the LLM 150B 205B to one of the generative system(s) 130. In response, the one of the generative system(s) 130 processes the request 206B using the LLM 150B to generate LLM output 207B. Further, the one of the generative system(s) 130 generates a response 208B based on the LLM output 207B, and transmits the response 208B to the client device 110. Notably, the one of the generative system(s) 130 utilizes the LLM 150B without utilization of any other of the candidate generative models 150. Transmitting the response 208B to the client device 110 causes the client device to render the response responsive to the request 201B.

Turning now to FIG. 3, a flowchart is depicted that illustrates an example method 300 of selecting, in response to receiving a request and from among multiple candidate generative models with differing computational efficiencies, none, one, or multiple generative model to utilize in generating a response to the request. For convenience, the operations of the method 300 are described with reference to a system that performs the operations. This system of the method 300 includes one or more processors, memory, and/or other component(s) of computing device(s) (e.g., client device 110 of FIG. 1, client device 510 of FIG. 5, one or more servers, and/or other computing devices). Moreover, while operations of the method 300 are shown in a particular order, this is not meant to be limiting. One or more operations may be reordered, omitted, and/or added.

At block 352, the system receives a request that includes a query. The query can be one formulated based on user interface input at a client device, such as typed input, voice input, input to cause an image to be captured or selected, etc. The query can be, for example, a voice query, a typed query, an image-based query, a multimodal query (e.g., that includes voice input and an image), or an inferred/parameterless query. In some implementations, when the query includes content that is not in textual format, the system can convert the query to a textual format or other format. For example, if the query is a voice query the system can perform automatic speech recognition (ASR) to convert the query to textual format. As another example, assume the query is a multimodal query that includes an image of an avocado and a voice input of "is this healthy". In such an example, the system can perform ASR to convert the voice input to text form, can perform image processing on the image to recognize an avocado is present in the image, and can perform coreference resolution to replace "this" with "an avocado", resulting in a textual format query of "is an avocado healthy".

The query can alternatively be an implied query, such as one formulated and/or submitted independent of any user input directed to formulating the implied query. For example, the query can be an implied query that is automatically generated based on profile data and that is automatically submitted. For instance, the implied query can be "machine learning", based on profile data indicating interest in machine learning topic(s). As another example, the query can be an implied query that is automatically generated and/or automatically submitted based on a current and/or recent context. As yet another example, the query can be an implied query that is submitted based on the user providing some indication of a desire to perform a search (e.g., pushing a search button, performing a search touch gesture, accessing a particular screen or state of an application), but that is generated automatically based on content currently being displayed at a client device, location, time of day, and/or other context signal(s).

At block 354, the system selects, based on request features of the request of block 352 and from a plurality of candidate generative models: a particular generative model to utilize in generating one or more responses to render responsive to the query of the request.

Block 354 can include sub-blocks 354A, 354B, and/or 354C. In some implementations, in selecting the particular generative model the system performs sub-block 354A and/or sub-block 354B without performing sub-block 354C. In some other implementations, in selecting the particular generative model the system performs at least sub-blocks 354A and sub-block 354C. For example, sub-block 354C can utilize the request feature(s) of sub-block 354A, and can optionally utilize the current server load of sub-block 354B.

At sub-block 354A, the system selects the particular generative model based on request feature(s), of the request of block 352, that include query feature(s), dialog context feature(s), and/or attribute feature(s).

At sub-block 354B, the system selects the particular generative model based on a current server load.

At sub-block 354C, the system processes the request features (e.g., generated at sub-block 354A), using a trained ML model, to generate ML output—and selects the particular generative model based on the ML output generated by the processing. Sub-block 354C can include further sub-block 354C1, in which the system selects the particular generative model based on probabilities, indicated by the output, for each of the generative models. For example, the output can include a vector of probabilities, where each of the probabilities is for a corresponding one of the generative models. Further, the system can select the particular generative model based on the probability, for the particular generative model, that is reflected in the ML output, and optionally based on considering one or more probabilities, for one or more other candidate generative models, reflected in the ML output. Further sub-block 354C1 optionally includes yet further sub-block 354C2, in which the system adjusts the probabilities based on computational efficiencies of the generative models associated with the probabilities and/or based on current server load (e.g., as determined at sub-block 354B). In some implementations, and as described herein, the ML model used in sub-block 354C can be trained using ground truth classification labels that take into account corresponding computational efficiency measures for the candidate generative models. In some of those implementations, yet further sub-block 354C2 can optionally be omitted or can consider only current server load.

At block 356, the system uses the selected particular generative model, selected in block 354, in generating response(s) to render responsive to the query included in the request of block 352. Notably, in generating the response(s), the system can utilize the selected particular generative model and without utilization of any other of the candidate generative models.

At block 358, the system causes the generated response(s), of block 356, to be rendered responsive to the query.

Turning now to FIG. 4, a flowchart is depicted that illustrates an example method 400 of generating training instances for training a machine learning model that can be utilized in selecting between multiple candidate generative models for a request, and training the machine learning model. This system of the method 400 includes one or more processors, memory, and/or other component(s) of computing device(s) (e.g., client device 110 of FIG. 1, client device 510 of FIG. 5, one or more servers, and/or other computing devices). Moreover, while operations of the method 400 are shown in a particular order, this is not meant to be limiting. One or more operations may be reordered, omitted, and/or added.

At block 452, the system identifies request features for a request and a ground truth response for the request. For example, the request can be for a query of "how to change DNS settings on Acme router", and the request features can include term(s) of the query and/or an embedding of term(s) of the query, such as a word embedding generated based on processing all the terms of the query using an encoder. Continuing with the example, the ground truth response for the request can be: "First, type the router's IP address in a browser, the default IP address is 192.168.1.1. Then enter username and password, the defaults are admin and admin. Finally, select the advanced settings tab and find the DNS settings section". The ground truth response can be one formulated by a human in response to the query and/or one that was verified by human rater(s) as being an appropriate response to the request. In various implementations, the requests and ground truth responses are identified from a curated database of high quality request and ground truth response pairs.

At block 454, the system selects a generative model from the multiple candidate generative models. For example, assume the candidate generative models include a first LLM, a second LLM, and a third LLM. The system can select the first LLM at a first iteration of block 454 for the request, select the second LLM at a second iteration of block 454 for the request, and select the third LLM at a third iteration of block 454 for the request.

At block 456, the system processes the request, of a most recent iteration block 452, using the selected generative model to generate output.

At block 458, the system generates a measure, for the selected generative model, based on comparing the output of block 456 to the ground truth response of a most recent iteration of block 452. Block 458 optionally includes sub-block 458A in which the system determines one or more scores, for the ground truth response in the output of block 452, and determines the measure based on the score(s). Such score(s) can include a perplexity score and/or a negative log-likelihood score.

At block 460, the system determines whether there are more generative models that have not yet been used for the request of the most recent iteration of block 452. If so, the system proceeds back to block 454 and selects another generative model from the candidates, processes the request using the other generative model to generate other output at block 456, and generates another measure for the other generative model at block 458. Accordingly, through multiple iterations of blocks 454, 456, and 458, a corresponding measure is generated, for each of the candidate generative models, based on the request of a most recent iteration of block 452.

If, at block 460, the system determines there are not any unused generative models for the request (i.e., a corresponding measure has been generated, for each of the candidate generative models, based on the request of a most recent iteration of block 452), the system proceeds to block 462.

At block 462, the system determines, based on the generated measures, ground truth classification labels that are each for one of the generative models. The ground truth classification labels can be soft labels or hard labels. For example, assume the candidate generative models include a first LLM, a second LLM, and a third LLM and the generated measures are 0.65 for the first LLM, 0.72 for the second LLM, and 0.88 for the third LLM. Based on such measures, the system can generate soft labels of [0.289, 0.320, 0.391] or hard labels of [0, 0, 1] where the first value in the labels corresponds to the first LLM, the second value corresponds to the second LLM, and the third value corresponds to the third LLM.

Block 462 optionally includes sub-block 462A, in which the system generates the ground truth classification labels based on the generated measures and based on computational efficiency measure(s) for the generative model(s). In performing sub-block 462A the system can, for more computationally efficient generative model(s), boost the soft label magnitude and/or boost the likelihood of a hot/positive hard label being assigned. In performing sub-block 462A the system additionally or alternatively can, for less computationally efficient generative model(s), decrease the soft label magnitude and/or decrease the likelihood of a hot/positive label being assigned. For example, the system can increase generated measure(s) for more computationally efficient generative model(s) and/or can decrease generated measure(s) for less computationally efficient generative model(s), then generate the ground truth classification labels based on the adjusted measure(s). In these and other manners, the system generates the ground truth classification labels so that they are adjusted in dependence on, and optionally proportionally to, the computational efficiencies of the generative models.

At block 464, the system stores a training instance that includes (1) training instance input with request feature(s) of a most recent iteration of block 452 and (2) training instance output with ground truth classification labels from a most recent iteration of block 462.

At block 466, the system determines whether more training instances are to be generated. If not, the system proceeds to block 468. If so, the system proceeds back to block 452 and identifies additional request features for an additional request and a corresponding additional ground truth response. The system then performs blocks 454-464 in generating and storing a training instance based on such additional request and corresponding additional ground truth response. In determining whether more training instances are to be generated the system can, for example, determine whether any requests and ground truth responses from a database have not yet been processed, whether a threshold quantity of training instances have been generated, and/or whether one or more other criteria have been satisfied.

At block 468, the system trains the machine learning model using the training instances. For example, the system can use batch or non-batch training techniques to process training instance input(s), of the training instance(s), using the machine learning model to generate predicted output(s) that are each corresponding predicted classification labels for the candidate generative models. The system can further generate a loss based on comparing the predicted output(s) to the ground truth classification labels of the training instance output(s). Further, the system can update the machine learning model based on the loss. For example, the system can update the machine learning model based on backpropagating the loss. Training of the model can continue until, for example, no unprocessed training instances remain, a threshold duration of training has occurred, a threshold quantity of training epochs have occurred, and/or one or more other training criteria have been satisfied.

Figure 5:
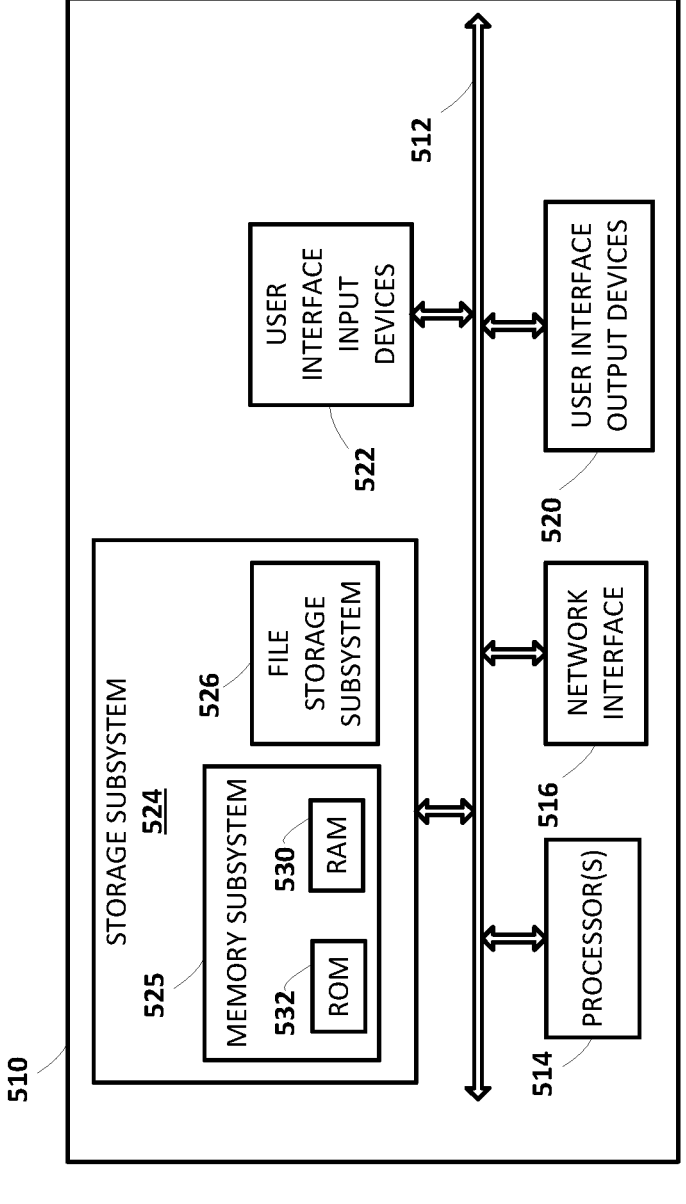
FIG. 5 depicts an example architecture of a computing device, in accordance with various implementations.

Turning now to FIG. 5, a block diagram of an example computing device 510 that may optionally be utilized to perform one or more aspects of techniques described herein is depicted. In some implementations, one or more of a client device, cloud-based automated assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIG. 1.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem 512 may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Some other implementations disclosed herein recognize that training a generative model can require a significant quantity (e.g., millions) of training instances. Due to the significant quantity of training instances needed, many training instances will lack input and/or output properties that are desired when the generative model is deployed for utilization. For example, some training instance outputs for an LLM can be undesirably grammatically incorrect, undesirably too concise, undesirably too robust, etc. Also, for example, some training instance inputs for an LLM can lack desired contextual data such as user attribute(s) associated with the input, conversational history associated with the input, etc. As a result of many of the LLM training instances lacking desired input and/or output properties, the LLM will, after training and when deployed, generate many instances of output that likewise lack the desired output properties.

Accordingly, some of those other implementations disclosed herein bifurcate training instances, for training a generative model, into two groups: a desired properties group and an undesired properties group. The desired properties group are those training instances that are determined to have the input and/or output properties that are desired when the generative model is deployed. The undesired properties group are those training instances that are not determined to have such desired input and/or output properties, or that are determined to have undesired input and/or output properties. Further, those implementations, in training the generative model, provide first token(s) as part of the training instance input for any training instances in the desired properties group and instead provide second token(s) as part of the training instance input for any training instances in the undesired properties group. The first token(s) and the second token(s) can be provided, for example, at the start of training instance input, at the end of training instance input, or as side input to the generative model. Yet further, those other implementations, after the generative model is trained and when the model is deployed for use, always apply the first token(s) only—without any application of the second token(s)—when processing a received input using the trained generative model. By always applying the first token(s) only at deployment time, and through training with the first token(s) for the desired properties group, this can cause the generative model to generate output, at deployment time, that is more likely to conform to the desired properties. Further, by applying the second token(s) during training based on the undesired properties group, this can prevent the model from generating output, at deployment time when the first token(s) are instead used, that has the undesired properties—while still enabling the model to train based on the undesired properties group, which can increase robustness of the model.

In some implementations, a method implemented by processor(s) is provided and includes receiving a request that includes a query formulated based on user interface input at a client device. The method further includes selecting, based on request features of the request and from a plurality of candidate large language models (LLMs), a particular LLM to utilize in responding to the request. The candidate LLMs include the particular LLM and an additional LLM that is less computationally efficient than the particular LLM. The method further includes, in response to selecting the particular LLM, causing the particular LLM to be utilized, without any utilization of the less computationally efficient additional LLM, in generating a response to the request. The method further includes causing the response, generated utilizing the particular LLM, to be rendered in response to receiving the query.

In some implementations, selecting, based on the request features of the request, the particular LLM, includes processing the request features using a trained machine learning model to generate output that indicates, for each of the candidate LLMs, a corresponding probability (e.g., a corresponding probability of generating a correct response) and selecting the particular LLM based on the particular probability, for the particular LLM, indicated by the output. The corresponding probabilities indicated by the output include a particular probability for the particular LLM and an additional probability for the additional LLM. Further, the trained machine learning model is more computationally efficient than the additional LLM and, optionally, is more computationally efficient than the particular LLM. In some versions of those implementations, selecting the particular LLM is further based on the additional probability, for the additional LLM, indicated by the output. In some of those versions, selecting the particular LLM includes: selecting the particular LLM based on determining the particular probability satisfies a first absolute threshold; determining the particular probability satisfies a relative threshold relative to the additional probability; and/or determining the additional probability fails to satisfy a second absolute threshold, the second absolute threshold being more restrictive than the first absolute threshold. In some variants of those versions, the method further includes: determining a current server load that characterizes a magnitude of current computational resource utilization in processing requests; and determining the first absolute threshold, the relative threshold, and/or the second absolute threshold as a function of the current server load. In some of those variants, the additional probability (for the additional LLM) indicates a greater probability of generating a correct response than does the particular probability (for the particular LLM).

In some implementations, the request features include one or more query features that are determined based on the query. In some of those implementations, the query includes text and the query features include one or more features generated based on the text.

In some implementations, the request is part of a multi-turn dialog and the request features include dialog context features that are based on one or more prior requests of the multi-turn dialog and/or based on one or more prior responses of the multi-turn dialog.

In some implementations, the request further includes an attribute identifier associated with the client device and/or with a user account of a user that provided the user interface input. In some of those implementations, the request features include an attribute feature that is based on the attribute identifier.

In some implementations, the additional LLM includes a first quantity of parameters, the particular LLM includes a second quantity of parameters, and the second quantity is at least twenty-five percent less than the first quantity. In some versions of those implementations, the second quantity is at least thirty-five percent less than the first quantity or the second quantity is at least fifty percent less than the first quantity. In some of those and/or other versions, the first quantity is greater than one billion or the first quantity is greater than one hundred billion.

In some implementations, the method further includes determining a current server load that characterizes a magnitude of current computational resource utilization in processing requests. In some of those implementations, selecting, from the plurality of candidate LLMs, the particular LLM, is further based on the current server load.

In some implementations, the candidate LLMs further include a third LLM.

In some implementations, the method further includes: receiving an additional request that includes an additional query formulated based on additional user interface input at the client device; selecting, based on additional request features of the additional request and from the plurality of candidate LLMs, the additional LLM for utilization in responding to the additional request; in response to selecting the additional LLM: causing the additional LLM to be utilized, without any utilization of the more computationally efficient particular LLM, in generating an additional response to the additional request; and causing the additional response, generated utilizing the additional LLM, to be rendered in response to receiving the additional query.

In some implementations, the method further includes generating, based on the request and using the particular LLM, the response to the request.

In some implementations, a method implemented by processor(s) is provided and includes identifying request features for a request and a ground truth response for the request. The method further includes, for each of a plurality of large language models (LLMs): processing the request, using the LLM, to generate corresponding LLM output; and generating a corresponding measure, for the LLM, by comparing the corresponding LLM output to the ground truth response. The method further includes determining, based on the corresponding measures, ground truth classification labels. Each of the ground truth classification labels is for a corresponding one of the candidate LLMs. The method further includes generating a training instance that includes: training instance input that includes the request features, and training instance output that includes the ground truth classification labels. The method further includes training a machine learning model using the training instance.

In some implementations, determining the ground truth classification labels includes determining hard ground truth classification labels. The hard ground truth classification labels include a single positive label, for one of the LLMs, and a negative label for all other of the LLMs.

In some implementations, determining the ground truth classification labels includes determining soft ground truth classification labels. Each of the soft ground truth classification labels comprise a corresponding non-binary probability.

In some implementations, generating the corresponding measure, for the LLM, by comparing the corresponding LLM output to the ground truth response includes: determining one or more scores for the ground truth response in the LLM output; and generating the corresponding measure based on the one or more scores. In some of those implementations, the one or more scores include a negative log-likelihood score and/or a perplexity score.

In some implementations, determining the ground truth classification labels is further based on corresponding computational efficiency measures for the LLMs. In some of those implementations, determining the ground truth classification labels further based on the corresponding computational efficiency measures for the LLMs includes modifying one or more of the corresponding measures based on the computational efficiency for the LLM based on which the corresponding measure is generated.

In some implementations, the request features include one or more query features that are determined based on a query included in the request. In some of those implementations, the query includes text and the query features include one or more features generated based on the text.

In some implementations, the request was part of a multi-turn dialog and the request features include dialog context features that are based on one or more prior requests of the multi-turn dialog and/or based on one or more prior responses of the multi-turn dialog.

In some implementations, the request includes an attribute identifier associated with the request, and the request features include one or more attribute features that are based on the attribute identifier.

In some implementations, the method further includes, subsequent to training the machine learning model using the training instance and additional training instances, using the machine learning model in determining which of the LLMs to utilize in responding to a received request. In some versions of those implementations, using the machine learning model in determining which of the LLMs to utilize in responding to the received request includes: processing received request features, of the received request, using the machine learning model to generate output that characterizes a corresponding probability for each of the LLMs; selecting, from among the LLMs and based on the generated output, a subset of the LLMs to utilize in responding to the received request; and causing the subset of the LLMs to be utilized, without any utilization of additional of the LLMs that are not in the selected subset, in generating a response to the received request. In some of those versions, the subset includes only a single of the LLMs. In some additional or alternative versions of those implementations, the method further includes determining a current server load that characterizes a magnitude of current computational resource utilization in processing requests—and selecting, from among the LLMs, the subset, is further based on the current server load.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more transitory or non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

receiving a request, the request including a query formulated based on user interface input at a client device;

processing, using a trained machine learning model, request features of the request to generate output;

selecting, based on the output generated using the trained machine learning model and from a plurality of candidate generative models, a particular generative model to utilize in responding to the request, wherein the candidate generative models include the particular generative model and an additional generative model that is less computationally efficient than the particular generative model, and wherein the trained machine learning model is not among the candidate generative models, is more computationally efficient than the particular generative model, and is more computationally efficient than the additional generative model;

in response to selecting the particular generative model based on the output generated using the trained machine learning model:

causing the particular generative model to be utilized, without any utilization of any other of the candidate generative models, in generating a response to the request; and causing the response, generated utilizing the particular generative model, to be rendered in response to receiving the query.

2. The method of claim 1, wherein the output indicates, for each of the candidate generative models, a corresponding probability of generating a correct response, the corresponding probabilities including a particular probability for the particular generative model and an additional probability for the additional generative model; and wherein selecting the particular generative model is based on the particular probability, for the particular generative model, indicated by the output.

3. The method of claim 2, wherein selecting the particular generative model is further based on the additional probability, for the additional generative model, indicated by the output.

4. The method of claim 3, wherein the additional probability indicates a greater probability of generating a correct response than does the particular probability.

5. The method of claim 3, wherein selecting the particular generative model comprises selecting the particular generative model based on:

determining the particular probability satisfies a first absolute threshold, determining the particular probability satisfies a relative threshold relative to the additional probability, and/or determining the additional probability fails to satisfy a second absolute threshold, the second absolute threshold being more restrictive than the first absolute threshold.

6. The method of claim 5, further comprising:

determining a current server load that characterizes a magnitude of current computational resource utilization in processing requests; and determining the first absolute threshold, the relative threshold, and/or the second absolute threshold as a function of the current server load.

7. The method of claim 1, wherein the request features include one or more query features that are determined based on the query.

8. The method of claim 7, wherein the query includes text and wherein the query features include one or more features generated based on the text.

9. The method of claim 1, wherein the request is part of a multi-turn dialog and wherein the request features include dialog context features that are based on one or more prior requests of the multi-turn dialog and/or based on one or more prior responses of the multi-turn dialog.

10. The method of claim 1, wherein the request further includes an attribute identifier associated with the client device and/or with a user account of a user that provided the user interface input, and wherein the request features include an attribute feature that is based on the attribute identifier.

11. The method of claim 1, wherein the additional generative model includes a first quantity of parameters, the particular generative model includes a second quantity of parameters, and the second quantity is at least twenty-five percent less than the first quantity.

12. The method of claim 11, wherein the second quantity is at least thirty-five percent less than the first quantity.

13. The method of claim 12, wherein the second quantity is at least fifty percent less than the first quantity.

14. The method of claim 1, further comprising:

determining a current server load that characterizes a magnitude of current computational resource utilization in processing requests;

wherein selecting, from the plurality of candidate generative models, the particular generative model, is further based on the current server load.

15. The method of claim 1, wherein the candidate generative models further include a third generative model.

16. The method of claim 1, further comprising:

receiving an additional request, the additional request including an additional query formulated based on additional user interface input at the client device;

processing, using the trained machine learning model, additional request features of the additional request to generate additional output;

selecting, based on the additional output generated using the trained machine learning model and from the plurality of candidate generative models, the additional generative model for utilization in responding to the additional request, in response to selecting the additional generative model:

causing the additional generative model to be utilized, without any utilization of the more computationally efficient particular generative model, in generating an additional response to the additional request; and causing the additional response, generated utilizing the additional generative model, to be rendered in response to receiving the additional query.

17. The method claim 1, further comprising:

generating, based on the request and using the particular generative model, the response to the request.

18. A system, comprising:

memory storing instructions;

one or more processors operable to execute the instructions to:

receive a request, the request including a query formulated based on user interface input at a client device;

process, using a trained machine learning model, request features of the request to generate output;

select, based on the output generated using the trained machine learning model and from a plurality of candidate generative models, a particular generative model to utilize in responding to the request, wherein the candidate generative models include the particular generative model and an additional generative model that is less computationally efficient than the particular generative model, and wherein the trained machine learning model is not among the candidate generative models, is more computationally efficient than the particular generative model, and is more computationally efficient than the additional generative model;

in response to selecting the particular generative model based on the output generated using the trained machine learning model:

cause the particular generative model to be utilized, without any utilization of any other of the candidate generative models, in generating a response to the request; and cause the response, generated utilizing the particular generative model, to be rendered in response to receiving the query.

19. The system of claim 18, wherein one or more of the processors are further operable to execute the instructions to:

determine a current server load that characterizes a magnitude of current computational resource utilization in processing requests;

wherein in selecting, from the plurality of candidate generative models, the particular generative model, one or more of the processors are to select the particular generative model further based on the current server load.

\* \* \* \* \*